United States Patent
Takahashi et al.

(10) Patent No.: US 9,292,105 B2
(45) Date of Patent: Mar. 22, 2016

(54) POINTING STICK

(71) Applicant: MINEBEA CO., LTD., Kitasaku-Gun, Nagano (JP)

(72) Inventors: Masahiro Takahashi, Hiratsuka (JP); Satoshi Sato, Fujisawa (JP); Masao Mori, Fujisawa (JP)

(73) Assignee: Minebea Co., Ltd., Nagano (JP)

( * ) Notice: Subject to any disclaimer, the term of this patent is extended or adjusted under 35 U.S.C. 154(b) by 192 days.

(21) Appl. No.: 14/072,877

(22) Filed: Nov. 6, 2013

(65) Prior Publication Data

US 2014/0145946 A1     May 29, 2014

(30) Foreign Application Priority Data

Nov. 29, 2012 (JP) ................... 2012-261767

(51) Int. Cl.
   *G06F 3/00*    (2006.01)
   *G06F 3/0338*    (2013.01)
(52) U.S. Cl.
   CPC .................... *G06F 3/0338* (2013.01)
(58) Field of Classification Search
   CPC ................... G08B 21/00; G09G 5/00
   See application file for complete search history.

(56) References Cited

U.S. PATENT DOCUMENTS

| | | | |
|---|---|---|---|
| 7,170,487 B2 | 1/2007 | Endo et al. | |
| 2002/0018048 A1* | 2/2002 | Seffernick et al. | 345/161 |
| 2005/0007338 A1* | 1/2005 | Endo et al. | 345/156 |

FOREIGN PATENT DOCUMENTS

JP     2004-246860 A     9/2004

* cited by examiner

*Primary Examiner* — Michael Faragalla
(74) *Attorney, Agent, or Firm* — Carrier Blackman & Associates, P.C.; Joseph P. Carrier; William D. Blackman (57) ABSTRACT

A pointing stick includes: an operation member, which is provided to operate a movement of a cursor displayed on a screen of an information processing device: and an attachment member, which supports the operation member to be stood, wherein an attachment leg is protruded from the operation member and is inserted through an insertion hole formed in the attachment member when assembling the pointing stick, and wherein the attachment leg is fixed to not protrude from a back face of the attachment member, which is opposite to an front face on which the operation member stands, after assembling the pointing stick.

13 Claims, 7 Drawing Sheets

POINTING STICK

CROSS-REFERENCE TO RELATED APPLICATION

This application claims priority from Japanese Patent Application No. 2012-261767 filed on Nov. 29, 2012, the entire subject matter of which is incorporated herein by reference.

TECHNICAL FIELD

This disclosure relates to a pointing stick which enables operation of a cursor by a tiling operation of an operating part and, specifically, a pointing stick which is used in a laptop computer (notebook PC) or a game machine or the like and suitable for miniaturization and a low profile.

BACKGROUND

For example, with the spread of a laptop computer, a pointing stick is used to move a cursor on a display of the laptop computer. In such a laptop computer, it is not necessary to use a mouse for moving the cursor on the display. Accordingly, it is possible to achieve space saving from the view point of a work space and, specifically, it is considered that the laptop computer is convenient when used in an airplane or train, and etc.

From the viewpoint of usage in a small interior of a machine or portability, the miniaturization of the laptop computer or the like has been strongly demanded. For this reason, an installation space of a pointing stick mounted on the laptop computer or the like becomes smaller.

From such a circumstance, various input devices suitable for the miniaturization have been suggested (see JP-A-2004-246860, for example)

SUMMARY

Recently, in portable devices such as a laptop computer, a portable game machine or a mobile phone, a consumer demand for a low profile is remarkable in addition to the miniaturization, and a demand for the miniaturization and the low profile has been raised more and more strongly.

In such a situation, the pointing stick mounted on the laptop computer or the like also needs to respond to the demand of further miniaturization and lower profile.

Meanwhile, in a case of pursuing such a miniaturization or low profile, components of the pointing stick tend to be even smaller since the pointing stick is one element that configures a portable device such as a laptop computer. Accordingly, each component constituting the pointing stick becomes even smaller, and there arises a difficulty in assembling. Specifically, in the assembly of the pointing stick, a method for fixing an operation member to an attachment member by thermally welding resin material of the operation member is often employed. In this case, there is a problem that an error occurs in a crush shape after welding by an assembly worker and therefore it is difficult to assemble the point stick in the same height. For this reason, there is a case that it is difficult to realize the low-profile laptop computer, and the point stick interferes with the other components in the assembly of the laptop computer since an installation space of the pointing stick is a limited area.

An object of the present disclosure is to provide at least a pointing stick, which is capable of realizing a low profile and achieving an excellent productivity.

In view of the above, a pointing stick according to one aspect of this disclosure, includes: an operation member, which is provided to operate a movement of a cursor displayed on a screen of an information processing device: and an attachment member, which supports the operation member in a standing position thereof, wherein an attachment leg is protruded from the operation member and is inserted through an insertion hole formed in the attachment member when assembling the pointing stick, and wherein the attachment leg is fixed to not protrude from a back face of the attachment member, which is opposite to a front face on which the operation member stands, after assembling the pointing stick.

According to this pointing stick having the above configurations, it is possible to realize the low profile and improvement in productivity of the pointing stick.

In the above-described pointing stick, the attachment leg may be made of resin material, and one end side of the insertion hole may be formed with a chamfered portion, whose diameter is gradually enlarged toward the back face of the attachment member, to confine the melted resin when a leading end of the attachment leg is fixedly welded to the attachment member to assemble the pointing stick.

According to this pointing stick having the above configurations, it is possible to improve durability of the pointing stick after assembling, in addition to realizing the low profile and improvement in productivity of the pointing stick.

In the above-described pointing stick, a concave portion may be formed at an end face on which the leading end of the attachment leg is melted.

According to this pointing stick having the above configurations, it is possible to further improve the durability of the pointing stick after assembling, in addition to realizing the low profile and improvement in productivity of the pointing stick.

A pointing stick of another aspect of this disclosure, comprises: an attachment member which has a leg insertion hole; and an operation member which is provided on a front face of the attachment member, wherein the operation member has an attachment leg attached to the attachment member, and wherein the attachment leg is inserted through the leg insertion hole and is fixed to not protrude from a back face of the attachment member.

According to this disclosure, it is possible to provide the pointing stick which is capable of realizing the low profile and has an excellent productivity.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, a pointing stick according to one illustrative embodiment of this disclosure will be described. A pointing stick 1 according to one illustrative embodiment of this disclosure includes an operation member 10 for operating a movement of a cursor displayed on a screen of an information processing device and an attachment member 20 supporting the operation member to be stood. Further, an attachment leg 13 protrudes from the operation member 10. The attachment leg 13 engages with a leg insertion hole 21 formed in the attachment member 20. After assembling the pointing stick, the attachment leg 13 is fixed to not protrude from a back face 20b of the attachment member 20, which is opposite to an front face on which the operation member 10 stands.

Figure 1:
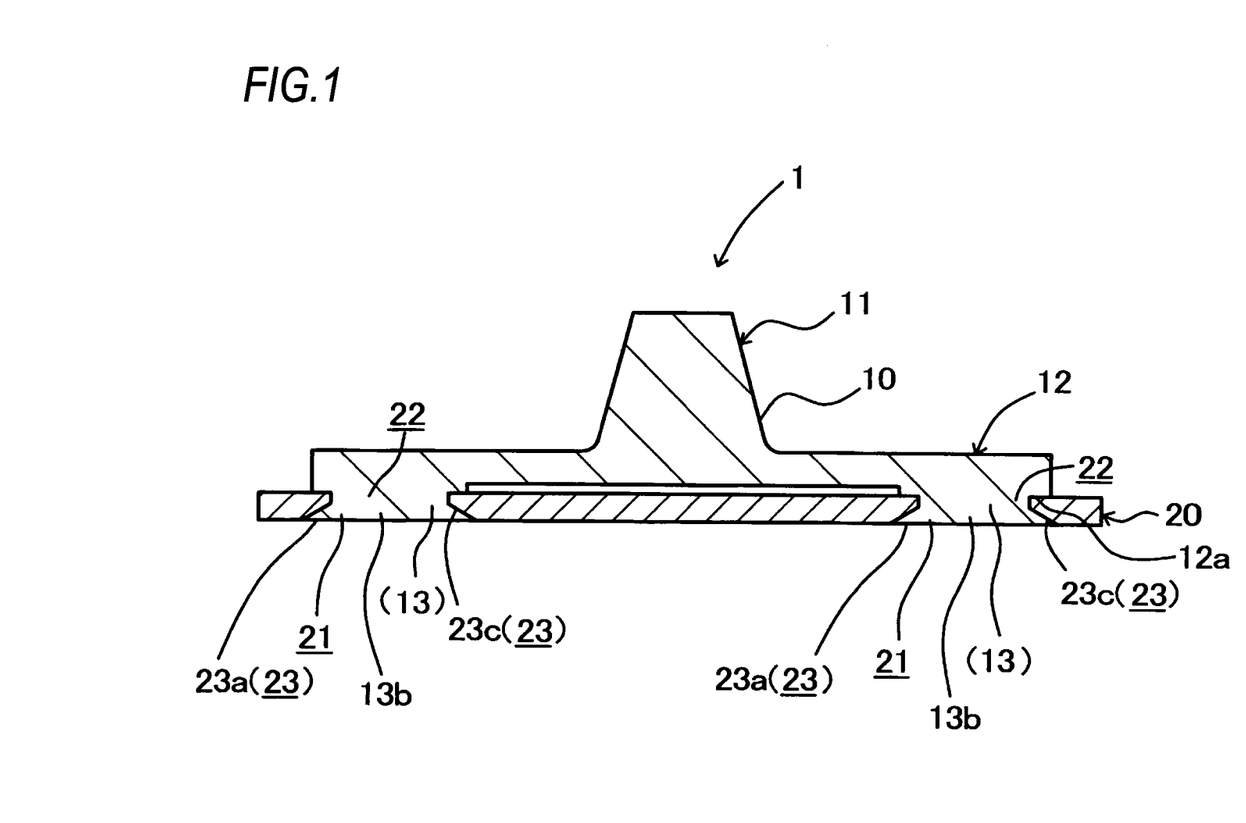
FIG. 1 is a cross-sectional view illustrating a pointing stick according to one illustrative embodiment of this disclosure.
Figure 2:
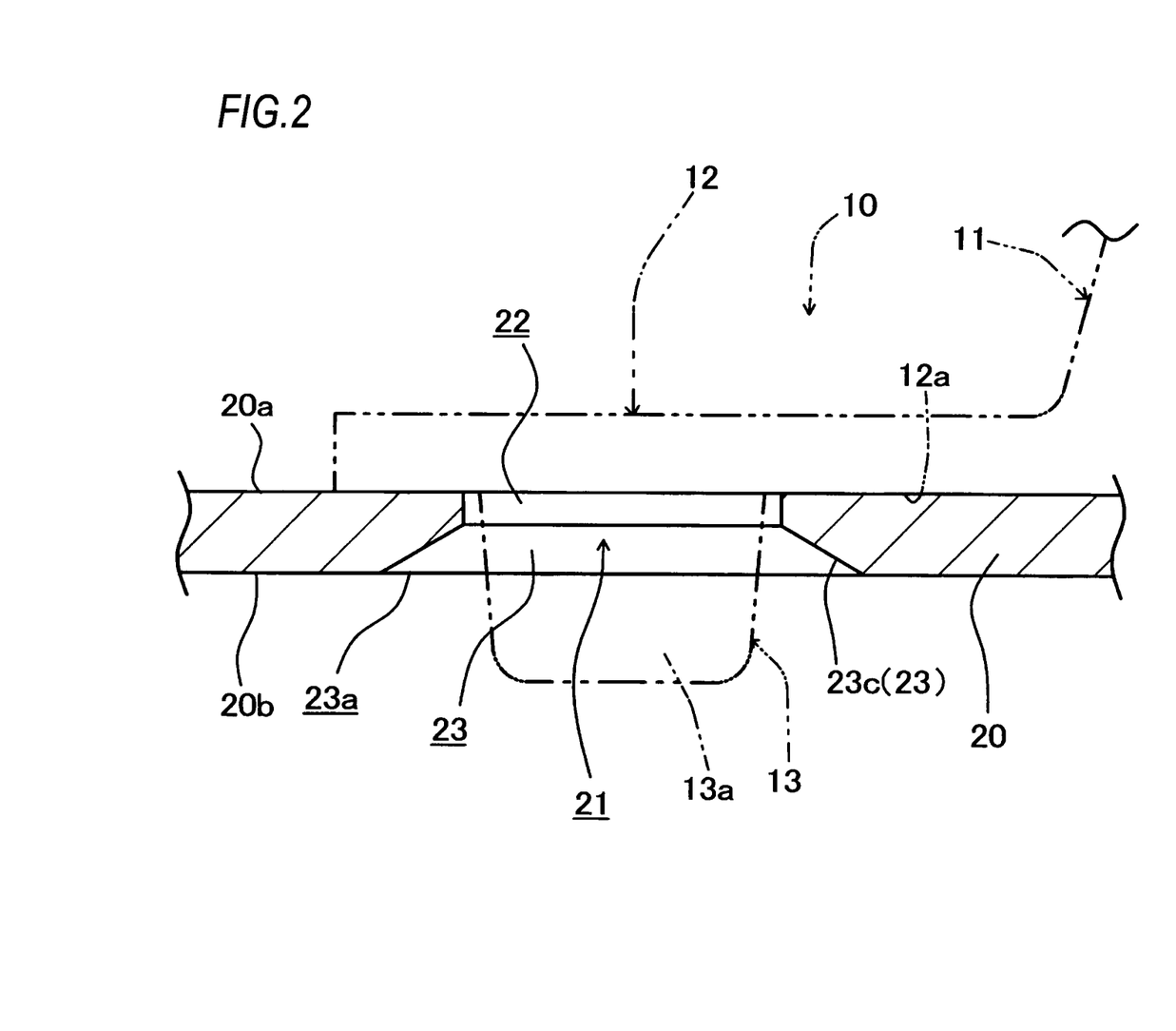
FIG. 2 is an enlarged cross-sectional view illustrating a portion near a leg insertion hole of an attachment member of the pointing stick shown in FIG. 1.

Hereinafter, a specific configuration of this pointing stick will be described in more detail with reference to the drawings. FIG. 1 is a cross-sectional view illustrating the pointing stick 1 according to one illustrative embodiment of this disclosure. In addition, FIG. 2 is an enlarged cross-sectional view illustrating a portion near the leg insertion hole 21 of the pointing stick 1 shown in FIG. 1.

The pointing stick 1 according to one illustrative embodiment of this disclosure is provided in a laptop computer having a display. Further, the pointing stick 1 is provided to control a position of the cursor displayed on the display of the laptop computer and to detect a stick operation corresponding to a left click operation of a mouse.

The operation member 10 of the pointing stick 1 includes a stick part 11 and a flexible base part 12 for supporting the stick part 11. The flexible base part 12 is provided with four strain gauges (not shown in this example) in parallel, whose resistance values are varied depending on the movement of the stick part 11. The four strain gauges detect the operation of the stick part 11 and thus move the cursor on the display of the laptop computer in a desired direction (to be described later), and it also detects a stick operation corresponding to a left click operation of a mouse (to be described later). Further, in the present embodiment, when assembling the pointing stick, three attachment legs 13 protrude from an opposite face 12a of a stick protruding side of the base part 12 (see, two-dot chain line in FIG. 2).

The stick part 11, the base part 12 and the attachment legs 13 of the operation member 10 are made of resin material, such as ABS resin, for example. The attachment legs 13 is fixedly welded to the attachment member 20 by melting a leading end of each attachment leg 13, and the melted resin material is confined within a chamfered portion (hereinafter, referred to as a "welding space 23") formed on the attachment member 20 (to be described later).

Further, as described above, the pointing stick 1 includes the attachment member 20 which has strength and rigidity sufficient to attach the operation member 10. In the present embodiment, the attachment member 20 is made of metallic plate such as stainless steel (SUS) and includes three leg insertion holes 21 to which three attachment legs 13 of the operation member 10 are inserted and welded. Each leg insertion hole 21 has some assembly tolerance since the attachment legs 13 before being melted are respectively inserted through each leg insertion hole with a margin, when assembling the pointing stick. Each leg insertion hole 21 includes a through hole 22 provided on an operation member side of the attachment member 20 and the welding space 23 which is formed continuously to the through hole 22 and has an opening 23a on a side of the attachment member 20 opposite to the operation member side.

The welding space 23 is formed concentrically with the through hole 22 and is formed to have a concave part having a conical shape whose diameter is gradually enlarged from a connection part with the through hole 22 toward the opening 23a. That is, the welding space 23 includes a tapered face 23c having a constant angle over an entire circumferential surface around its central axis, so that the welding space 23 is configured with a chamfered portion whose diameter is gradually enlarged from one end of the through hole 22 toward the opening 23a. In the present embodiment, a taper angle of an inner peripheral surface of the welding space 23 is a shallow angle of about 30 degrees to the opening 23a of the welding space 23.

In the present embodiment, a ratio of a depth of the welding space 23 and an entire length of the through hole 22 is about 2:1. That is, the through hole 22 is formed to be corresponded to about one-third of a thickness of the attachment member 20 from a side provided with the operation member 10, and the welding space 23 continuous to the through hole is formed to be corresponded to about two-third of the thickness of the attachment member 20 from a back face of the attachment member opposite to a face 20a provided with the operation member 10, as seen in a thickness direction of the attachment member 20.

When attaching the operation member 10 to the attachment member 20, three attachment legs 13 of the operation member 10 are respectively inserted into three leg insertion holes 21 of the attachment member 20 through the openings 23a of the through holes 22 and the leading end of each attachment leg 13 and a vicinity thereof protrude from the opening 23a of the welding space 23 in three leg insertion holes 21 of the attachment member 20. Hereinafter, the protruding portion of the attachment leg is referred to as a "pre-melt protruding portion 13a" and a welded portion after melting is referred to as a "welded fixing portion 13b". Then, the pre-melt protruding portion 13a of each attachment leg 13 is melted by using a welding tip 100 (see FIG. 9A) (to be described later), and the welded fixing portion 13b is confined within the welding space 23 so that the attachment leg does not protrude from an opposite face 20b of the attachment member 20. At this time, the pre-melt protruding portion 13a of the attachment leg 13 is melted into the welded fixing portion 13b on the tapered face 23c that forms an inner periphery of the welding space 23 by using the above-described welding tip 100, so that the welded fixing portion 13b is uniformly bonded to the attachment member 20. That is, the welded fixing portion 13b of the attachment leg 13 is melted and bonded by a circumferentially-uniform bonding force applied onto an entire inner peripheral surface, which has a fairly large area forming the taper shape of the welding space 23.

Figure 3:
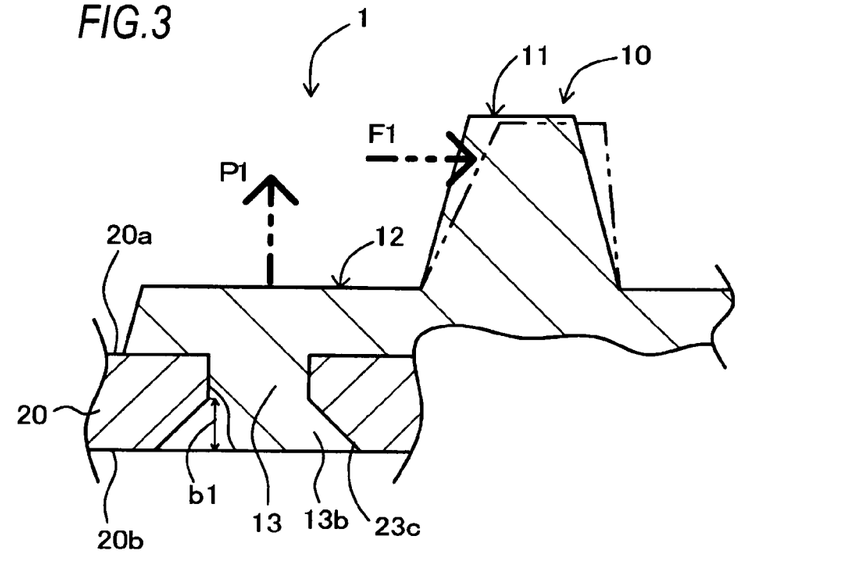
FIG. 3 is an explanatory view illustrating an operation of the pointing stick according to the embodiment.

Subsequently, beneficial effect of the pointing stick 1 of the present embodiment as compared to a background example will be described with comparing both sticks. FIG. 3 is an explanatory view illustrating an operation of the pointing stick 1 according to the embodiment. Further, FIG. 4 is an explanatory view illustrating an operation of a background pointing stick 5, as compared to FIG. 3.

In each drawing, force F1 represents an operating force acting on the pointing sticks 1 and 5, and force P1 represents a tensile force generated in the pointing sticks 1 and 5 depending on the force F1. Further, a distance b1 in FIG. 3 represents a distance required for preventing the welded fixing portion 13b of the pointing stick 1 from being removed against the tensile force P1. Further, in this configuration, a distance a1 in FIG. 4 represents a distance, which is most closely related to a magnitude of the tensile force P1 acting on the background pointing stick. A height h1 in FIG. 4 represents a height of a cross-sectional arc-shape of a welded protruding portion 53b that is obtained by melting an attachment leg 53 protruding from an attachment member 60. The height h1 is a height required to improve for realizing a low profile of the pointing stick 5.

Figure 4:
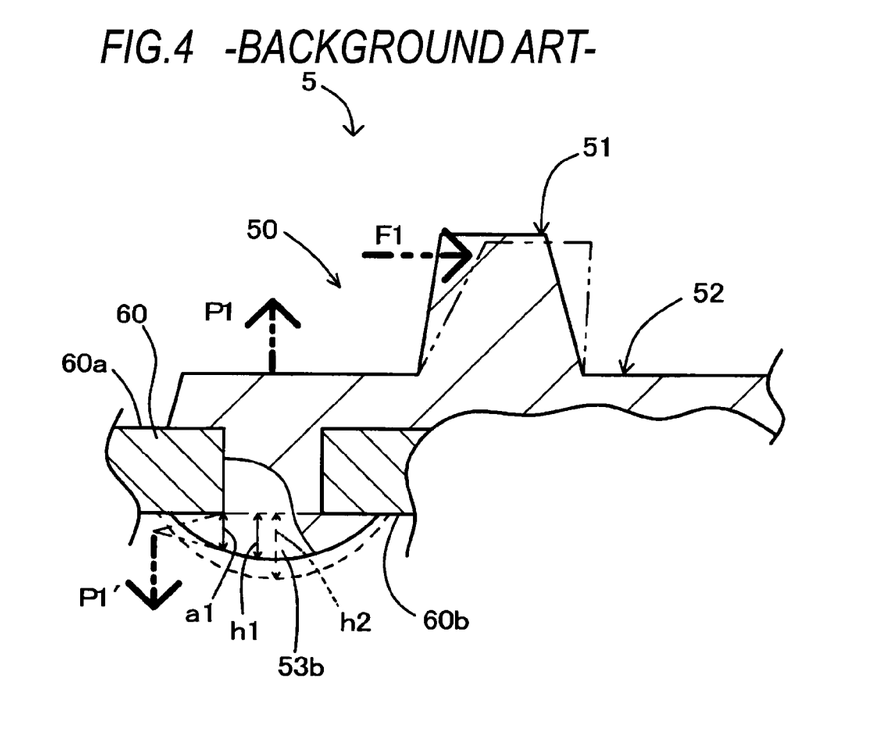
FIG. 4 is an explanatory view illustrating an operation of a background pointing stick, as compared to FIG. 3.

In FIG. 4, the tensile force P1 is generated when the operating force F1 is applied. At this time, it is necessary to lower the height h1 to some extent in order to achieve the low profile of the pointing stick 5. For this reason, the distance a1 depending on the height h1 becomes smaller than a height in which the welded protruding portion 53b can endure a tensile force P1'. As a result, the left end of portion of the welded protruding portion 53b of the drawing is removed as indicated by a two-dot chain line. In order to avoid such a removal effect, it is necessary to increase the height of the welded protruding portion 53b to at least a height h2, as indicated by a dotted line in the drawing. However, such a countermeasure does not meet a demand for the low profile of the pointing stick 5.

On the other hand, in the case of the pointing stick 1 according to the present embodiment shown in FIG. 3, the welded fixing portion 13b of the attachment leg 13 is melted and bonded by the circumferentially-uniform bonding force applied onto the entire inner peripheral surface, which has the fairly large area forming the taper shape of the welding space 23, it is not necessary to protrude the welded fixing portion 13b from an opposite face of an operation member side of the attachment member 20, just by ensuring a short distance b1 in FIG. 3. Accordingly, it is possible to satisfy the demand for the low profile of the pointing stick 1.

Figure 5A:
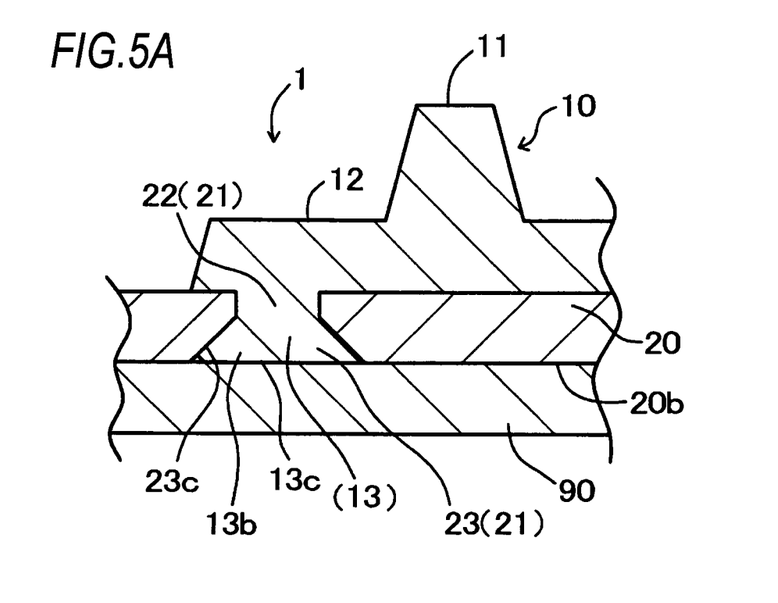
FIG. 5A is an enlarged cross-sectional view illustrating an example of an aspect, which describes an actual use of the pointing stick according to the embodiment.

Subsequently, a second beneficial effect of the pointing stick 1 of the present embodiment will be described in comparison to the background pointing stick 5. FIG. 5A illustrates a contact state of a circuit board 90 with a back face (opposite face) (hereinafter, referred to as an "opposite face 20b") of the attachment member 20 opposite to a front face, on which the operation member 10 of the pointing stick 1 of the present embodiment stands. In the case of the pointing stick 1 according to the present embodiment, the welded fixing portion 13b of the attachment leg 13 is melted and bonded by the circumferentially-uniform bonding force applied onto the entire inner peripheral surface, which has the fairly large area forming the taper shape of the welding space 23, as described above. Accordingly, As is clear from the drawing, the circuit board 90 can be contacted closely with the opposite face 20b in a state, where the attachment leg 13 of the operation member 10 of the pointing stick 1 of the present embodiment does not protrude from the opposite face 20b and the operation member 10 is firmly fixed to the attachment member 20. Therefore, it is possible to realize the low profile of the pointing stick 1 and thus realize the low profile of device on which the pointing stick 1 is mounted.

Figure 5B:
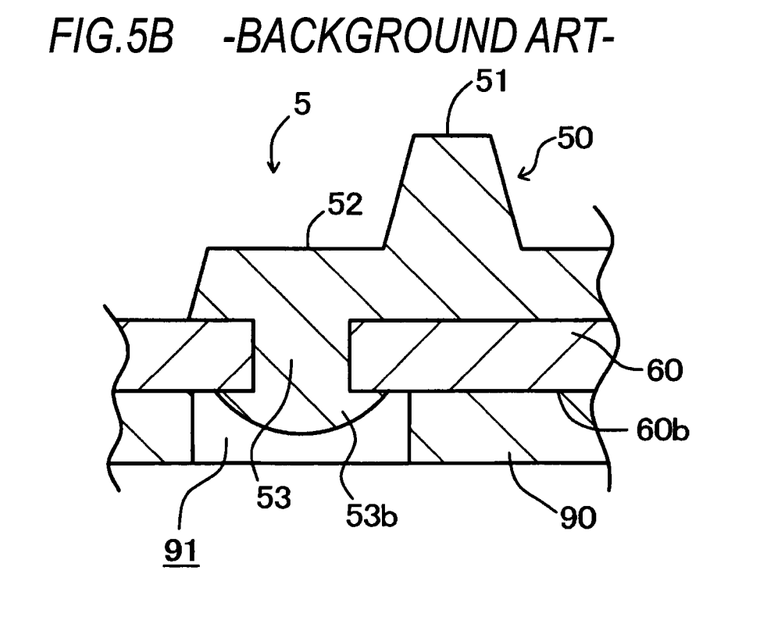
FIG. 5B is an enlarged cross-sectional view illustrating an example of an aspect, which describes an actual use of a background pointing stick.

Further, FIG. 5B illustrates a contact state of the circuit board 90 with a back face (opposite face) (hereinafter, referred to as an "opposite face 60b") of the attachment member 60 opposite to a face, on which an operation member 50 of the background pointing stick 5 stands. As is clear from the drawing, since the welded protruding portion 53b of the attachment leg 53 of the operation member 50 protrudes downward from the opposite face 60b, it is necessary to form, on the circuit board, a relief hole 91 as a relief space for the protruding portion. For this reason, manufacturing cost of the circuit board 90 is increased, and it is necessary to secure a space having a margin, in order to prevent interference between the welded protruding portion 53b and the circuit board 90 during assembling both. Consequently, a portion corresponding to the space having the margin becomes a dead space, in which a wiring pattern (not shown in this example) of the circuit board 90 is not to be provided, and thus a degree of freedom of the wiring pattern is reduced.

On the other hand, in the case of the pointing stick 1 according to the present embodiment, since the circuit board 90 can be contacted with an end face 13c of the welded fixing portion 13b of the attachment leg 13, as described above, the dead space of the wiring pattern of the circuit board 90 is eliminated. Therefore, the degree of freedom of the wiring pattern is improved.

Figure 6A:
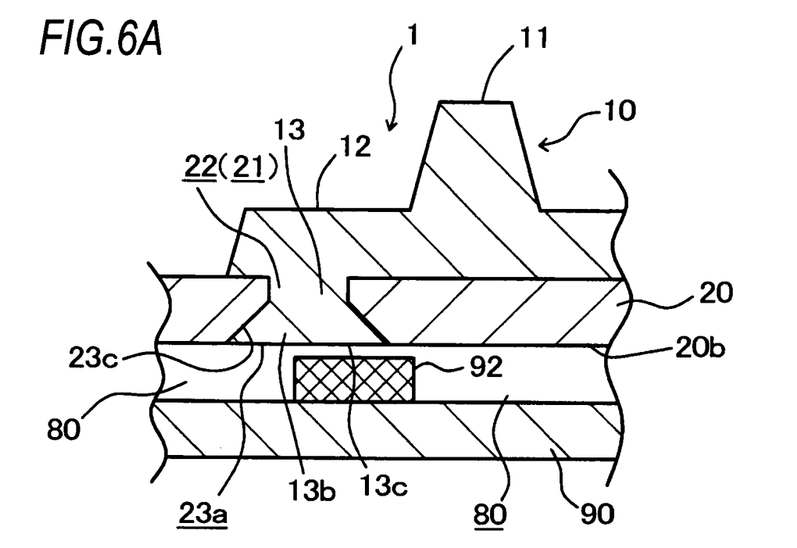
FIG. 6A is an enlarged explanatory view illustrating an another aspect different from FIG. 5A, which describes the pointing stick according to the embodiment.
Figure 6B:
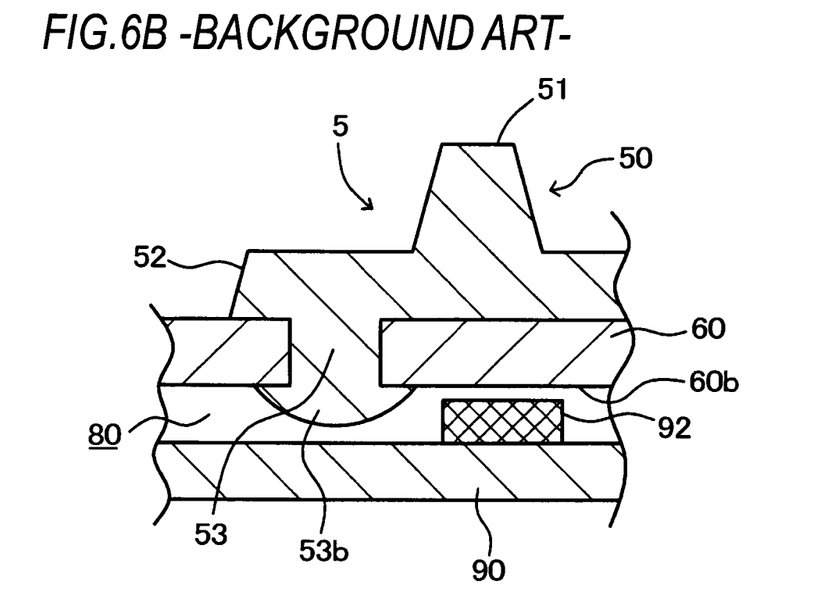
FIG. 6B is an enlarged explanatory view illustrating an another aspect different from FIG. 5B, which describes a background pointing stick.

Subsequently, a third beneficial effect of the pointing stick 1 of the present embodiment as compared to the background pointing stick 5 will be described with comparing both sticks. FIG. 6A is an explanatory view illustrating a state where the circuit board 90 mounting a surface-mounting component 92 such as a capacitor is placed on a lower side of the attachment member 20 in the pointing stick 1 of the present embodiment, and FIG. 6B is an explanatory view illustrating a state where the circuit board 90 mounting a surface-mounting component 92 such as a capacitor is placed on a lower side of the attachment member 60 in the background pointing stick 5. As is clear from a comparison between these figures, a gap 80 for mounting the above-described surface-mounting component 92 is provided between the attachment members 20 or 60 and the circuit board 90, therefore, in the present embodiment, the surface-mounting component 92 on the circuit board 90 can be placed to face the end face 13c of the welded fixing portion 13b of the attachment leg 13. Accordingly, a region, which is located on the circuit board 90 and face the end face 13c of the attachment leg 13, can be effectively used as a surface-mounting region.

Meanwhile, in the background pointing stick 5, since the welded protruding portion 53b of the attachment leg 53 protrudes to a surface-mounting component placed side of the circuit board 90, it is necessary that the circuit board 90 or the surface-mounting component 92 is provided not to interfere with the welded protruding portion 53b. As a result, a region facing the circuit board 90 corresponding to the welded protruding portion 53b and its vicinity area become a dead space, so that a high-density mounting of components is hindered. Further, in a case where a beginner who is not skilled in an assembly work performs the assembly work of the pointing stick 5, the surface-mounting component 92 mounted on the circuit board 90 may hit the welded protruding portion 53b of the attachment leg 53 protruding from the opposite face 60b of the attachment member 60. That is, there is a risk that the surface-mounting component 92 is removed from the circuit board 90 or the surface-mounting component 92 itself is broken.

On the other hand, in the case of the pointing stick 1 according to the present embodiment, since the welded fixing portion 13*b* of the attachment leg 13 does not protrude from the opposite face 20*b* of the attachment member 20 facing the circuit board 90 as described above, the problem that occurred during assembling the above-described background pointing stick 5 does not occur.

Figure 7:
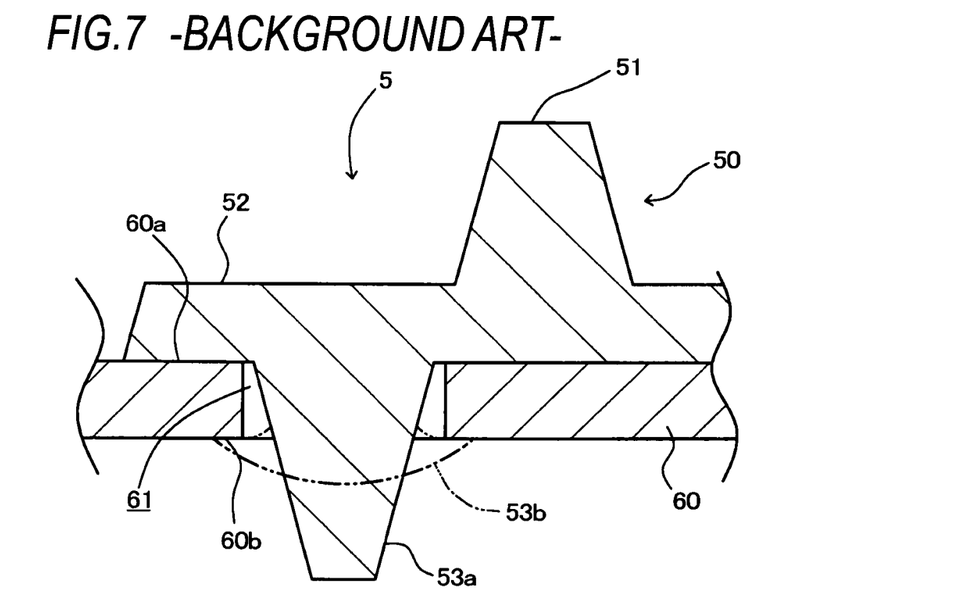
FIG. 7 is an enlarged cross-sectional view illustrating an actual state of an attachment leg of a background pointing stick before and after being welded to an attachment member.
Figure 8:
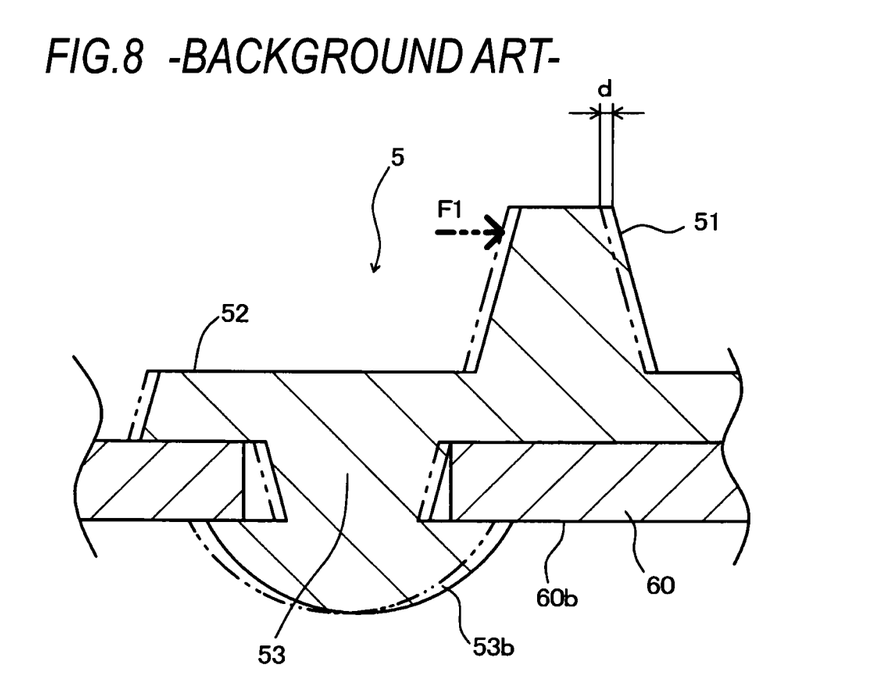
FIG. 8 is an explanatory view illustrating problems occurring when operating the background pointing stick shown in FIG. 7.

Subsequently, a fourth beneficial effect of the pointing stick 1 of the present embodiment will be described in comparison to the background pointing stick 5. FIG. 7 is an enlarged cross-sectional view illustrating an actual state of the attachment leg 53 of the background pointing stick 5 before and after being welded as the welded protruding portion 53*b* to the attachment member 60. Further, FIG. 8 is an explanatory view illustrating problems occurring when operating the background pointing stick 5 shown in FIG. 7. As shown in FIG. 7, in the background pointing stick 5, an inner diameter of the leg penetrating hole 61 is formed slightly larger than an outer diameter of the attachment leg 53 of the operation member 50, which is an assembly tolerance in order to improve a productivity of the pointing stick. Accordingly, as shown in FIG. 7, after the attachment leg 53 is melted, the welded protruding portion 53*b* is formed so as to be bonded to the opposite face 60*b*, as indicated by a two-dot chain line in FIG. 7.

According to such a forming method, the operation member 50 is attached to the attachment member 60 in a state where the attachment member 60 is clamped by a clamping force generated between a contacting face 60*a* of the attachment member 60 contacting a base part 52 of the operation member 50 and the above-described opposite face 60*b* of the attachment member 60 contacting the welded protruding portion 53*b*.

According to such an attaching state, as shown in FIG. 8, when the force F1 is continuously applied to a stick part 51 of the operation member 50 over a long period of time, the above-described clamping force is weakened and the stick part 51 is moved in an applying direction of the force F1 due to the assembly tolerance between the attachment leg and leg penetrating hole (see size "d" in FIG. 8). Thus, it is unfavorable to give a sense of discomfort for a user due to even such a slight movement of the stick part 51 in the operation direction, which occurs each time the user operates the stick part 51.

On the other hand, in the case of the pointing stick 1 according to the present embodiment, the welded fixing portion 13*b* is firmly bonded to the tapered face 23*c* of the welding space 23. Accordingly, movement as in the above-described background pointing stick 5 does not occur even when a slight assembly tolerance exists between an inner diameter of the leg insertion hole 21 and an outer diameter of the attachment leg 13 in order to improve the productivity of the pointing stick 1 as described above. Accordingly, the pointing stick 1 does not give the sense of discomfort that occurs in the above-described background pointing stick 5 to a user, even when the pointing stick 1 of the present embodiment is used for a long period.

Figure 9A:
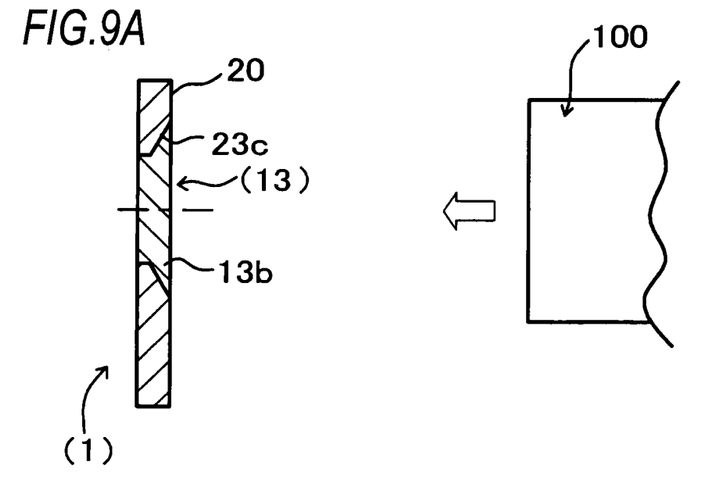
FIG. 9A is an explanatory view illustrating an assembly process of the pointing stick according to one illustrative embodiment of this disclosure.

Subsequently, a method for welding the attachment leg 13 of the pointing stick 1 of the present embodiment and a method for welding an attachment leg 13' of a pointing stick according to a modification of the present embodiment will be described. FIG. 9A illustrates a method for welding the attachment leg 13 of the pointing stick 1 according to one illustrative embodiment of this disclosure. In FIG. 9A, the heated welding tip 100 with a columnar shape is pressed toward the pre-melt attachment leg 13 that protrudes from the attachment member 20 (see an arrow direction in the figure). Thereby, the pre-melt protruding portion 13*a* (see FIG. 2) of the attachment leg 13 protruding from the attachment member 20 is confined in the welding space 23, and a tapered outer periphery of the welded fixing portion 13*b* is firmly welded over the entire periphery of the tapered face 23*c* that forms a peripheral surface of the welding space 23 by a pressing force of the welding tip 100. Since the tapered face 23*c* has a shallow taper angle as described above, the area of the tapered face is large and therefore it is possible to firmly weld the attachment leg 13 to the attachment member 20.

Figure 9B:
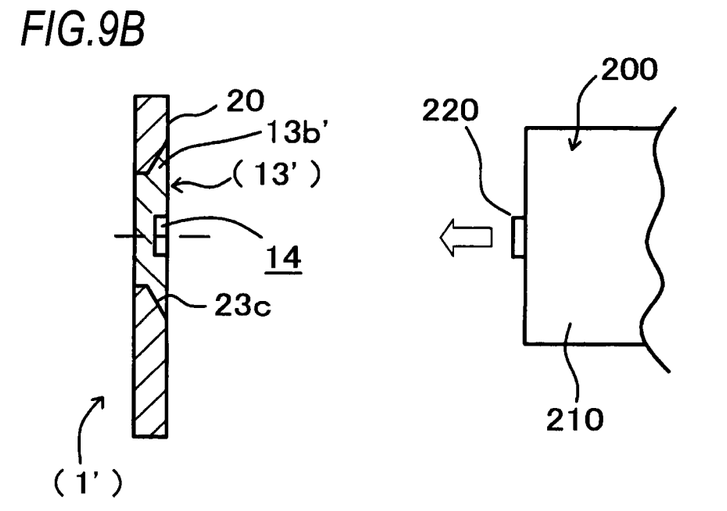
FIG. 9B is an explanatory view illustrating an assembly process of a pointing stick according to a modification of the embodiment.

Meanwhile, in a modification of the present embodiment shown in FIG. 9B, a projection 220 having a diameter smaller than that of a tip body 210 is formed at a leading end of a welding tip 200, which is concentric with the tip body. Then, by pressing the projection 220 against the pre-melt protruding portion 13*a* protruding from the attachment member 20 as shown by an arrow in FIG. 9B in a state where an axis of the welding tip 200 corresponds to an axis of the attachment leg 13', a concave portion 14 is formed on a center of a welded fixing portion 13*b'* in addition to the shape as shown in FIG. 9A. The projection 220 of the welding tip 200 is pressed against a leading end of the pre-melt protruding portion 13*a* in order to form such a concave portion 14. Therefore, the melted resin is directed toward the tapered face 23*c* and thus it is possible to fill the melted resin more easily. In this way, the tapered outer periphery of the welded fixing portion 13*b* can be more firmly welded over the entire periphery of the tapered face 23*c* forming a portion of the welding space 23.

The projection 220 of the welding tip 200 according to a modification is not limited to the shape shown in FIG. 9B. Specifically, the protruding portion may have a conical shape or a hemispherical shape, for example, as long as the welded fixing portion of the attachment leg can be pressed against the entire periphery of the tapered face by a circumferentially uniform force. Even when using such a protruding portion, it is possible to firmly attach the welded fixing portion of the attachment leg over the entire periphery of the tapered face of the attachment member having the same effects as the above-described effects.

Further, in this disclosure, material of the operation member of the pointing stick is not limited to a resin material. Specifically, it may be made of a metallic material. However, in this case, the attachment leg is fixed to the chamfered portion (a portion corresponding to "the welding space" in the present embodiment) of the attachment member by a swaging. By swaging the attachment leg to not protrude from the opposite face of the attachment member, the same effects as the present embodiment can be achieved.

Further, the materials, shapes, sizes, and number of pieces described in the above illustrative embodiments are only illustrative and other materials, shapes, dimensions and number may be variously selected without departing from the scope of this disclosure.

Further, although this disclosure has been applied to the laptop computer in the present embodiment, this disclosure is not limited to the laptop computer. It may be applied to an operating stick of a portable game machine and so on.

What is claimed is:

1. A pointing stick comprising:
    an operation member, which is provided to operate a movement of a cursor displayed on a screen of an information processing device: and
    an attachment member, which supports the operation member in a standing position thereof, wherein an attachment leg is protruded from the operation member and is inserted through an insertion hole formed in the attachment member when assembling the pointing stick, wherein the attachment leg is fixed to not protrude from a back face of the attachment member, which is opposite to a front face on which the operation member stands, after assembling the pointing stick, wherein the attachment leg is made of resin material, and wherein one end side of the insertion hole is formed with a chamfered portion, whose diameter is gradually enlarged toward the back face of the attachment member, to confine the melted resin when a leading end of the attachment leg is fixedly welded to the attachment member to assemble the pointing stick.

2. The pointing stick according to claim 1,
wherein a concave portion is formed at an end face on which the leading end of the attachment leg is melted.

3. A pointing stick comprising:
an attachment member which has a leg insertion hole; and
an operation member which is provided on a front face of the attachment member,
wherein the operation member has an attachment leg attached to the attachment member,
wherein the attachment leg is inserted through the leg insertion hole and is fixed to not protrude from a back face of the attachment member,
wherein an inner diameter of the leg insertion hole on the back face of the attachment member is larger than that of the leg insertion hole on the front face of the attachment member, and
wherein the leg insertion hole is composed of a through hole opened vertically to the front face of the attachment member and an opening whose diameter is enlarged from the through hole.

4. The pointing stick according to claim 3,
wherein the diameter of the opening is gradually enlarged from the through hole.

5. The pointing stick according to claim 3,
wherein the opening has a conical shape.

6. The pointing stick according to claim 3,
wherein a depth of the through hole is about one-third in a plate thickness of the attachment member.

7. The pointing stick according to claim 3,
wherein an angle between an inner face of the opening and the back face of the attachment member is about 30 degrees.

8. The pointing stick according to claim 3,
wherein the attachment member is made of metallic material.

9. The pointing stick according to claim 3,
wherein the attachment leg is made of resin material.

10. The pointing stick according to claim 9,
wherein a leading end of the attachment leg is the melted resin material.

11. The pointing stick according to claim 10, wherein a concave portion is formed at an end face of the leading end of the attachment leg.

12. The pointing stick according to claim 9,
wherein the operation member includes a base part, a stick part and the attachment leg, and
wherein the base part, the stick part and the attachment leg are formed as one piece.

13. The pointing stick according to claim 12,
wherein a strain gauge is attached to the base part.

* * * * *